Sept. 27, 1949.  R. J. EHRET  2,483,364
AUTOMATIC RECALIBRATING MOTOR CONTROL APPARATUS
Filed June 4, 1948

*INVENTOR.*
ROBERT J. EHRET
BY Arthur H. Swenson
ATTORNEY

Patented Sept. 27, 1949

2,483,364

UNITED STATES PATENT OFFICE 2,483,364

AUTOMATIC RECALIBRATING MOTOR CONTROL APPARATUS

Robert J. Ehret, Philadelphia, Pa., assignor, by mesne assignments, to Minneapolis-Honeywell Regulator Company, Minneapolis, Minn., a corporation of Delaware Application June 4, 1948, Serial No. 31,159

2 Claims. (Cl. 318—28)

The present invention relates to self-balancing, measuring and/or controlling apparatus having a measuring circuit including a slide wire resistor and a slider contact adjusted along said resistor to rebalance said circuit when the latter is unbalanced by a change in the value of the quantity measured, and also including an element adjustable to regulate the circuit energizing current as required to maintain said circuit in a properly calibrated or standardized condition.

The object of the present invention is to provide improved means for automatically effecting rebalancing adjustments of said slider contact during measuring periods, and for automatically effecting standardizing adjustments of said element during standardizing periods which alternate at suitable intervals with the measuring periods. More specifically, the object of the invention is to provide means for energizing the separate rebalancing and standardizing motors for alternate operation, each in selective accordance with the direction and extent of operation needed, by connecting the control windings of the two motors, alternately, in parallel with the condenser included in the output circuit of a motor drive system of known type, and for maintaining a discharge circuit for said condenser of relatively low impedance during the portion of each transition interval or period in which the apparatus is being adjusted between its running or measuring and its standardizing conditions, in which portion neither motor is operatively energized. Such a condenser discharging circuit serves the purpose of preventing the condenser from accumulating a charge during the transition period which will give an objectionable kick to whichever of the two motors becomes operatively connected to the energizing circuit during said period.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figure 1:
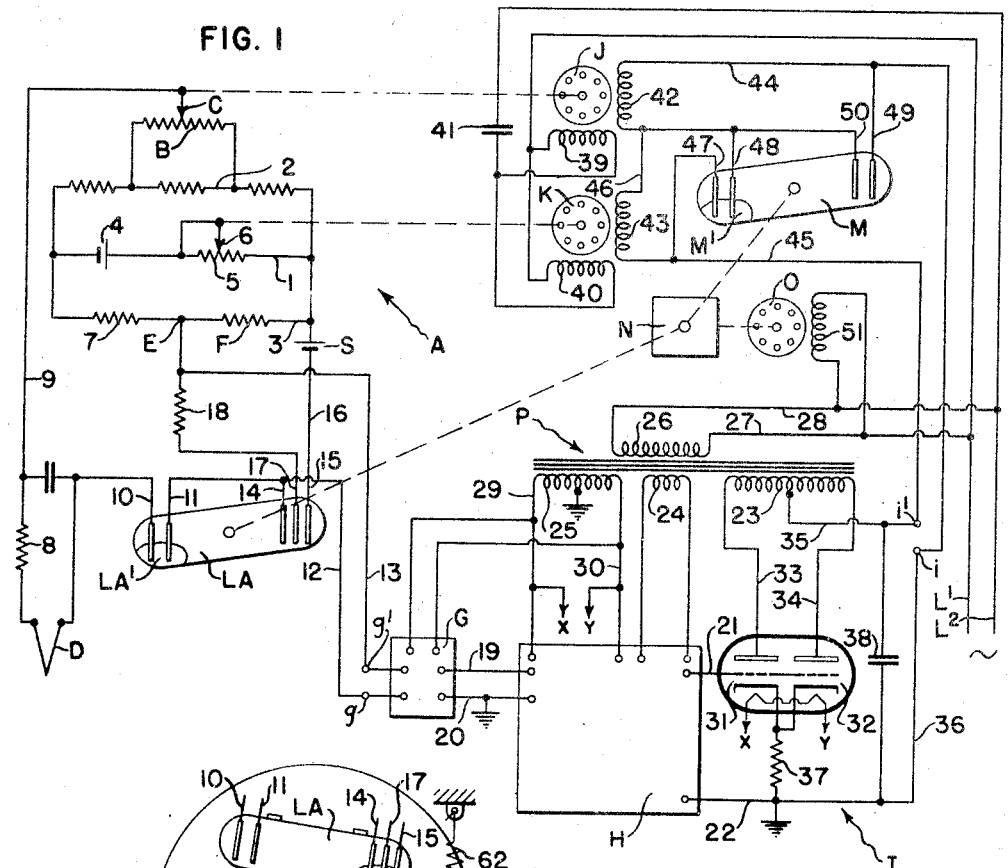
Figure 2:
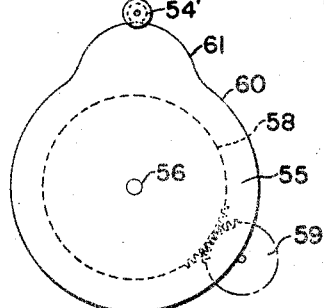

Of the drawings:

Fig. 1 is a circuit diagram illustrating self-balancing potentiometric measuring apparatus embodying the present invention; and Fig. 2 is an elevation of a switch mechanism shown diagrammaticaly in Fig. 1.

The self-balancing potentiometric measuring system illustrated by way of example in Fig. 1 includes a measuring bridge circuit A, and includes a reversible electric motor J for rebalancing said circuit A when the latter becomes unbalanced as a result of a change in the value of the quantity measured. The apparatus shown in Fig. 1 also includes a reversible electric motor K for use in recalibrating or standardizing the measuring circuit A at suitable intervals. An automatic switch mechanism, shown as including tilting mercury switches LA and M, is employed to connect electrically the motor J to the measuring circuit A through a conversion element G, a voltage amplifier H and a power amplifier unit I for rebalancing operations during periods alternating with periods in which the motor K is operatively connected by said switch mechanism to the measuring circuit A through the elements G, H and I for standardizing operations. The converter G operates in a known manner to convert a unidirectional voltage signal into an alternating current signal to facilitate its amplification by the elements H and I.

The measuring circuit A is a potentiometric bridge circuit of conventional type, comprising an energizing branch I and two resistance branches 2 and 3 connected in parallel with each other and in parallel with the energizing branch I. A slide wire resistor B is connected in shunt to a predetermined portion of the resistance branch 2. In rebalancing operations, a slider contact C is adjusted along the resistor B by the motor J. The energizing branch of the circuit A includes a source 4 of unidirectional voltage, which is usually a dry cell, and an adjustable resistor 5, more or less of which is short-circuited by a slider contact 6. The latter is adjusted along the resistor 5 by the motor K in the recalibrating or standardizing operation. The resistance branch 3 of the circuit A includes a calibrating or standardizing resistor F at the right of a point E, and includes a resistor 7 at the left of the point E. The resistor 7 ordinarily provides temperature compensation. The standardizing operation involves the adjustment of the slider contact 6 along the resistor 5 as required to give the bridge energizing current flow from the source 4 such a magnitude that the potential drop in the resistor F is equal and opposite to the voltage of a standard cell S which is connected in series with the resistor F during each standardizing operation, and which is open-circuited at other times.

As shown in Fig. 1, the circuit A is used in measuring the voltage of a thermocouple D which has one terminal permanently connected through a resistor 8 and a conductor 9 to the rebalancing slider contact C. The second terminal of the thermocouple D is connected to the bridge point E in the measuring condition of the apparatus, and is open-circuited when the apparatus is adjusted into its standardizing condition. The thermocouple D is connected and disconnected from the bridge point E by the tilting of the mercury switch LA. In the normal measuring condition of the apparatus, the switch LA is in the inclined position shown in Fig. 1 in which position the mercury LA' in the tubular container element of the switch connects switch terminals 10 and 11. The terminal 10 is connected directly to the right-hand terminal of the thermocouple D, and the switch terminal 11 is connected by a conductor 12 to one of the input terminals g of the converter G. The second input terminal g' of the converter G is connected by a conductor 13 to the bridge circuit point E. The terminals g and g' are connected in a known manner by circuit elements included in the converter G, as is hereinafter explained.

When the switch LA is tilted out of its measuring position, shown in Fig. 1, into its standardizing position as shown in Fig. 2, the mercury LA' shifts from the left-hand end to the right-hand end of the tubular container element, and thus disconnects the terminals 10 and 11 and then connects the switch terminal 14, 15, and 17. The switch terminal 15 is connected by a conductor 16 to one terminal of the standard cell S. The second terminal of the cell S is connected to the right-hand end of the bridge branch 3. In consequence, when the switch terminals 14 and 15 are connected, the standardizing resistor F and the standard cell S are connected in series in a standardizing circuit including the conductor 13, input terminals g' and g and the internal circuit elements of the convertor G, the conductor 12, switch terminal 14, switch terminal 15, and conductor 16. In the circuit just described, the voltage of the standard cell S and the voltage, or potential drop, across the standardizing resistor F are in bucking relation. The standardizing operation involves the adjustment of the slider contact 6 along the resistor 5 into the position in which the potential drop in the resistor F is equal in magnitude, but opposite in direction, to the voltage of the standard cell S, so that there is then no voltage difference between the input terminals g and g' of the convertor G.

The switch LA includes a terminal 17 which is connected to the terminal 14 by the mercury LA' when the switch LA is in its standardizing position, shown in Fig. 2. The terminal 17 is connected through a resistor 18 to the conductor 13. In consequence, during the standardizing operation in which the mercury LA' connects the terminals 14 and 17, the resistor 18 is connected in shunt to the input circuit of the convertor G. The resistor 18 then serves to prevent the signal impressed on the input circuit of the convertor G from being undesirably large, as it may otherwise be when the voltage across the resistor F differs by a relatively large amount from the voltage of the standard cell S at the beginning of a standardizing operation. As those skilled in the art will understand, periodic standardizing operations are normally required to compensate for the decrease in the voltage of the bridge energizing battery 4 as the latter ages.

Although the current flow between the input terminals g and g' is sometimes in one direction and sometimes in the opposite direction, it is always unidirectional at any one time, regardless of whether said current flow is due to unbalance in the measuring system in the normal operation of the apparatus, or is due to a difference between the voltage drop in the resistor F and the voltage of the cell S in the standardizing condition of the apparatus. The purpose and effect of the convertor G is to convert the unidirectional signal impressed on its input terminals into an alternating current signal. The latter is transmitted by conductors 19 and 20 from the output terminals of the convertor G to the input terminals of the voltage amplifier H. The latter has its output terminals connected by conductors 21 and 22 to the input circuit of the power amplifier I. The latter has its output terminals i and i' connected to control windings of the motors J and K, as hereinafter described.

The convertor G, voltage amplifier H, power amplifier I and the hereinafter described power windings of the motors J and K are all energized by alternating current supplied by supply conductors L' and L². The latter are normally connected to a source of alternating current of conventional voltage and frequency, usually 110–115 volts, and 60 cycles per second, respectively. In operation, the alternating current signal applied by the convertor G to the input terminals of the voltage amplifier H is of the frequency of the voltage across the supply conductors L' and L², is of a phase depending on the polarity of the unidirectional voltage signal impressed on the input terminals g and g' of the convertor G, and is of a magnitude proportional to that of said signal, regardless of whether this signal is due to unbalance of the measuring apparatus during a measuring operation, or is due to the need for standardization existing during a standardizing operation.

The motor control elements G, H and I and the motor J may well be, and are assumed to be, of the well known type and form included in the widely used measuring and controlling potentiometer disclosed in the Wills Patent 2,423,540 of July 8, 1947, and need not be described in detail herein. The elements G, H and I are energized by alternating current supplied by one or another of the secondary windings 23, 24 and 25 of a transformer P, which has its primary winding 26 connected to the supply conductors L' and L² by respective conductors 27 and 28. The transformer secondary winding 25 supplies alternating current through its terminal conductors 29 and 30 to energize a vibrator device included in the element G, to heat the cathode heaters of the electronic valves included in the voltage amplifier H, and to heat the cathode heaters of the two valves included in the power amplifier I. The midpoint of the secondary winding 25 is grounded. The vibrator device of the element G operates to create pulsating currents which flow through the primary winding of a transformer included in the element G and having the terminals of its secondary winding connected by the conductors 19 and 20 to the input terminals of the voltage amplifier H.

One of the valves included in the element H rectifies alternating current supplied by the transformer secondary winding 24 to provide unidirectional plate supply voltage for each of the voltage amplifying valves, of which there are usually three, included in the element H.

The secondary windings 23 of the transformer P supplies anode voltage to two valves 31 and 32 of the power amplifier I. As shown, the anode of the valve 31 is connected by a conductor 33 to one end terminal of the winding 23, and the anode of the valve 32 is connected by a conductor 34 to the other end terminal of the winding 23. The midpoint of the winding 23 is connected by a conductor 35 to the output terminal i' of the power amplifier I. The second output terminal i of the power amplifier is connected by a conductor 36 and a common cathode resistor 37 for the valves 31 and 32 to the cathode of each of those valves. The output conductor 36 is also connected to ground, as are the conductors 20 and 22. The control grid of each of the valves 31 and 32 is connected to the output circuit conductor 21 of the voltage amplifier H. A condenser 38 is connected between the output conductors 35 and 36 of the power amplifier I.

In the operation of the apparatus shown in Fig. 1, any unidirectional signal applied to the terminals g and g' of the input circuit of the convertor G during a measuring operation, or during the standardizing operation, produces an output signal across the output terminals i and i' of the power amplifier I. Said output signal varies in magnitude with the magnitude of the input signal, and is in phase, or is 180° out of phase, with the voltage across the supply conductors L² and L', accordingly as the current flow in the input circuit of the converter G is in one direction or in the opposite direction. In respect to the relationship of the signal applied to the input circuit of the convertor G to the output signal of the power amplifier I, there is no difference between the apparatus shown in Fig. 1 and the apparatus disclosed in the prior Wills patent mentioned hereinbefore.

Each of the motors J and K is also like the single rebalancing motor shown in said prior Wills patent in that it comprises a power winding connected across the supply conductors L' and L² in series with a corresponding condenser, and in that it includes a control winding connected across the power amplifier output terminals. The control windings of the motors J and K are interrelated, however, in a novel and useful manner shortly to be described.

As shown, the power winding 39 of the motor J and the power winding 40 of the motor K are connected in parallel with each other, and this parallel combination is connected in series with a condenser 41 across the supply conductors L' and L². The control winding 42 of the motor J and the control winding 43 of the motor K are connected in series with one another between the power amplifier output terminals i and i', one terminal of the winding 42 being connected to the power amplifier terminal i by a conductor 44, and one terminal of the control winding 43 being connected to the power amplifier terminal i' by a conductor 45. The remaining terminals of the windings 42 and 43 are connected together by a conductor 46.

The previously mentioned switch M, when in its measuring position as shown in Fig. 1, short-circuits the control winding 43 of the standardizing motor K, but does not short-circuit the control winding of the rebalancing motor J. When the switch M is in its standardizing condition as shown in Fig. 2, it short-circuits the rebalancing motor control winding 42 of the rebalancing motor J, but does not short-circuit the winding 43 of the motor K. The switch M, in the form shown, effects its short-circuiting actions by virtue of the fact that it includes a terminal 47, which is connected to the conductor 45, and a terminal 48 which is connected to the conductor 46, and that the terminals 47 and 48 are at the left-hand end of the switch and are connected by the mercury body M' of the switch M when that switch is in its measuring position of Fig. 1.

When the switch M is tilted out of the position shown in Fig. 1 into the standardizing position shown in Fig. 2, the mercury body M' moves away from the left-hand end of the switch, thus disconnecting the terminals 47 and 48, and then connects switch terminals 49 and 50 located at the right-hand end of the switch. The terminal 49 is connected to the conductor 44, and the terminal 50 is connected to the conductor 46, so that the control winding 42 of the motor J is short-circuited when the switch contacts 49 and 50 are connected as shown in Fig. 2.

The switches LA and M may be simultaneously tilted manually to adjust the apparatus between its measuring and standardizing conditions, but are preferably tilted by automatic mechanism. The latter may take various forms. As diagrammatically shown in Fig. 1, the switches LA and M are simultaneously tilted by a tilting mechanism N which is actuated by a synchronous timing motor O. The latter is shown as including an operating winding 51 which is connected directly across the conductors 27 and 28 and hence is connected across the supply conductors L' and L². As shown in Fig. 2, the tilting mechanism N of Fig. 1 comprises an oscillatable switch support 52, shown as a disc pivoted to turn back and forth about a pivot or shaft 53. The support 52 is oscillated by means comprising a link or a thrust member 54 pivotally connected at one end to the disc 52 and having its opposite end provided with a roller 54' in engagement with an edge cam 55 which rotates continuously about the axis of a driven supporting shaft 56. The movement of the lower end of the member 54 transverse to its length is restricted by a guide 57 through which the member 54 extends with freedom for longitudinal movement. The guide 57 is free to turn about a suitable pivot point, not shown. The cam 55 is driven at a suitably slow speed through speed reducing gearing rotated by the motor O and shown as including gears 58 and 59. The edge of the cam 55 is in the form of an arc 60 extending circularly about the cam 55 for a little less than 360°. The remainder of the edge of the cam 55 comprises a projection 61 between the ends of the arc 60. The outer edge of the projection 61 extends farther away from the shaft 56 than does the circular arc 60. Except when prevented by the projection 61, the roller 54' bears against the arc 60, being held in engagement with the latter by a bias spring 62 connected to the support 52 and tending to turn the latter in the counterclockwise direction.

When the roller 54' is in engagement with the arc 60, the switches LA and M occupy positions which correspond to the positions of the switches shown diagrammatically in Fig. 1. When the roller 54' is engaged by the projection 61, the support 52 is turned clockwise to move the switch members LA and M into their standardizing positions, shown in Fig. 2, in which the contacts 14, 15 and 17 of the switch LA are connected by the mercury LA'. In this position of the switch support, the contacts 49 and 50 of the switch M are connected by the mercury M'. When, as a result of the rotation of the cam 55, the roller 54' moves off the projection 61 and back into engagement with the arc surface 60, the spring 62 tilts the support 52 into the position in which the switches LA and M occupy the positions shown diagrammatically in Fig. 1.

The general operation of the potentiometric measuring apparatus shown in Fig. 1 will be apparent to those skilled in the art from the foregoing description, and particularly in view of the disclosure of said prior Wills patent and in view of the extensive use of the apparatus disclosed in said patent. The special structural and operational characteristic of the apparatus shown in Fig. 1, claimed as novel herein, pertains to the means for connecting the motor control windings 42 and 43 to, and disconnecting them from, the power amplifier I so that each of the motors J and K may be energized during periods in which the other motor is deenergized.

As was explained hereinbefore in connection with Fig. 1, one terminal of the control winding 42 is permanently connected by the conductor 44 to the amplifier output terminal $i$, one terminal of the control winding 43 is permanently connected by the conductor 45 to the amplifier output terminal $i'$, and the second terminals of the windings 42 and 43 are permanently connected by the conductor 46. The conductor 44, winding 42, conductor 46, winding 43, and conductor 45 collectively form a path for the flow of current between the terminals $i$ and $i'$ during each switch tilting period in which the mercury body M' is moving from one end to the other of the switch M and hence connects neither the terminals 47 and 48 nor the terminals 49 and 50. In the measuring condition of the apparatus, in which the mercury M' connects the switch terminals 47 and 48, the standardizing motor winding 43 is short-circuited and the rebalancing motor winding 42 is effectively connected directly across the amplifier output terminals $i$ and $i'$. Similarly, in the standardizing condition of the apparatus in which the mercury M' connects the switch terminals 49 and 50, the rebalancing motor winding 42 is short-circuited and the standardizing motor winding 43 is effectively connected directly across the terminals $i$ and $i'$.

The series connected motor windings 42 and 43 thus form a discharge connection for current flow between the opposite terminals of the condenser 38. The capacity of the condenser 38 and the resistance of each of the control windings 42 and 43 may have the values customarily given to corresponding elements of potentiometric instruments embodying the invention of said prior Wills patent. Thus, the condenser 38 may have a capacity of 1 microfarad, and each of the windings 42 and 43 may have a resistance of 500 ohms. In consequence, the condenser discharge path formed by the series connected windings 42 and 43 has a desirably low impedance. The series connected windings 42 and 43 thus prevent the condenser 38 from accumulating an objectionable charge during the adjustment of the switch M, as it is apt to do during any period in which the condenser 38 forms the only connection between the output terminals $i$ and $i'$ of the amplifier system.

I have discovered that with the more usual switching arrangement in which the control windings of both of the motors are simultaneously disconnected from the amplifier output terminals during the switching period, the motor operatively connected to the amplifier at the end of the switching operation may be given a kick which produces an objectionable shift in position of the slider contact C or 6 adjusted by the motor. Such a kick occurs as a result of a transient current flow through the control winding of the motor. I have further discovered that such transient current flow is due wholly or mainly to the charge which accumulates on the condenser 38 during the portion of the switching operation in which neither of the windings 42 and 43 is connected between the amplifier output terminals, and the condenser 38 forms the only connection across the amplifier output terminals.

The transient condition producing the above mentioned motor kick is objectionable, and is especially objectionable in case of a measuring instrument having a control circuit, since the kick may then actuate a control switch, and may cause chatter. Any such shift of the rebalancing slider contact C is also attended by an undesirable displacement of the pen or other recording element usually included in such instruments.

One instance of the above-mentioned usual type of switching arrangement, for alternately connecting two electrical actuating devices or devices to be actuated across a circuit, is found in the means associated with the switch LA in Fig. 1 for alternately connecting the thermocouple D and standardizing circuit operatively across the input terminals of the convertor G. As will be apparent, during the portion of the period of adjustment of the switch LA from one operative position to the other in which the mercury body LA' does not connect either the switch terminals 10 and 11, or the switch terminals 14, 15, and 17, the conductor 12 is connected neither to the thermocouple D nor to the standardizing circuit. Thus, for the particular purposes for which the applicant provides the switching arrangement including the switch M of Fig. 1, the type of switching arrangement including the switch LA of Fig. 1, is not a practical equivalent.

While in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. In a self-balancing measuring apparatus of the known type having a running condition and a standardizing condition and comprising a measuring circuit including a slide wire resistance adjustable to rebalance said circuit if unbalanced while in its running condition and including a calibration resistance adjustable to restandardize said circuit if restandardization is needed while the apparatus is in its standardizing condition, means including a convertor and an amplifier having an output circuit including a condenser and operative when said apparatus is unbalanced while in its running condition to produce and amplify a low frequency alternating current signal of a magnitude proportional to the extent of unbalance, and of one phase or the opposite phase depending on the direction of unbalance, and operative when the apparatus is in its standardizing condition to produce and amplify a signal of said low frequency of a magnitude proportional to the extent of standardizing action needed, and of one phase or the opposite phase depending on the direction of the standardizing action needed, a reversible electric rebalancing motor having a control winding operatively connected in said output circuit in parallel with said condenser when the apparatus is in running condition, and a reversible electric standardizing motor having a control winding operatively connected in said output circuit in parallel with said condenser when said apparatus is in its standardizing condition, the improvement which consists in structural means operative to adjust the apparatus between its running and standardizing conditions during intervening transition periods and including switching means for adjusting the connections of the control windings of the two motors to said output circuit during each transition period so as to make operative the motor previously inoperative, and to make inoperative the motor previously operative, and including conductor means for maintaining a discharging circuit of relatively low impedance across said condenser during the portion of each transition period in which neither motor is operative.

2. In self-balancing measuring apparatus of known type having a running condition and a standardizing condition and comprising a measuring circuit including a slide wire resistance adjustable to rebalance said circuit if unbalanced while in its running condition and including a calibration resistance adjustable to restandardize said circuit if restandardization is needed while the apparatus is in its standardizing condition, means including a convertor and an amplifier having an output circuit including a condenser and operative when said apparatus is unbalanced while in its running condition to produce and amplify a low frequency alternating current signal of a magnitude proportional to the extent of unbalance, and of one phase or the opposite phase depending on the direction of unbalance, and operative when the apparatus is in its standardizing condition to produce and amplify a signal of said low frequency of a magnitude proportional to the extent of standardizing action needed, and of one phase or the opposite phase depending on the direction of the standardizing action needed, a reversible electric rebalancing motor having a control winding operatively connected in said output circuit in parallel with said condenser when the apparatus is in running condition, and a reversible electric standardizing motor having a control winding operatively connected in said output circuit in parallel with said condenser when said apparatus is in its standardizing condition, the improvement which consists in connecting means for permanently connecting the two control windings in series with one another in said output circuit and in parallel with said condenser, and switching means for short-circuiting the control winding of said standardizing motor during each period in which the apparatus is in its running condition, and for short-circuiting the control winding of said rebalancing motor during each period in which the apparatus is in its standardizing condition, whereby said windings form a condenser discharging means of relatively low impedance during each interval while the apparatus is being changed from one to the other of its two conditions.

ROBERT J. EHRET.

No references cited.